United States Patent Office 3,262,828
Patented July 26, 1966

3,262,828
METHOD FOR JOINING GLASS PARTS
James D. Mallory, Maumee, and L. D. Ryan, Toledo, Ohio, assignors to Owens-Illinois Glass Company, a corporation of Ohio
Filed Dec. 3, 1962, Ser. No. 241,629
3 Claims. (Cl. 156—295)

This invention relates to a method for applying glass handles to glass articles. More specifically, this invention relates to a method for applying glass handles to the side wall of glass tumblers with an epoxy resin to form tankards or mugs.

It has been the practice in the past to form tankards or mugs by press forming a charge or gob of molten glass into a unitary handle and body mold. Obviously, such a mold would have to be of a two-piece type, split along a plane passing through the center of the handle and diametrically across the body of the ware. A tankard or mug formed in such a fashion will result in mold marks along the split line in the form of a raised, somewhat unsightly seam.

A second method is where the body portion or tumbler portion of the ware is formed in a blow molding process and a separately formed handle is joined to the tumbler. It has been the practice to join the handle to the tumbler by remelting or softening a portion of the tumbler and the handle portion which is to be joined to the tumbler in order to fuse the two pieces together. Obviously, this process involves considerable expense and time in reheating and additionally, there is always the possibility of distorting the tumbler by the reheating process. A further drawback in welding the handles to the tumblers by reheating and fusion, is the setting up of stresses within the ware due to the reheating, which stresses may weaken the body or tumbler portion of the ware.

With the foregoing in mind, it is an object of this invention to provide a method of joining a handle to the side wall of a tumbler which requires little or no heating.

It is an additional object of this invention to provide a method of joining a handle to the side wall of a tumbler by utilizing an epoxy resin as the adhesive.

It is a further object of this invention to provide a method for handling a plurality of tumblers and handles and for conveying and assembling the handles to the tumblers in predetermined sequence.

It is a still further object of this invention to provide a method for conveying oriented tumblers and handles through a sequence of steps in which an epoxy resin is deposited on the tumbler and the handle positioned and held in contact with the side of the tumbler where the epoxy is applied.

Other and further objects will be apparent from the following description taken in conjunction with the annexed sheets of drawing, wherein.

Figure 1:
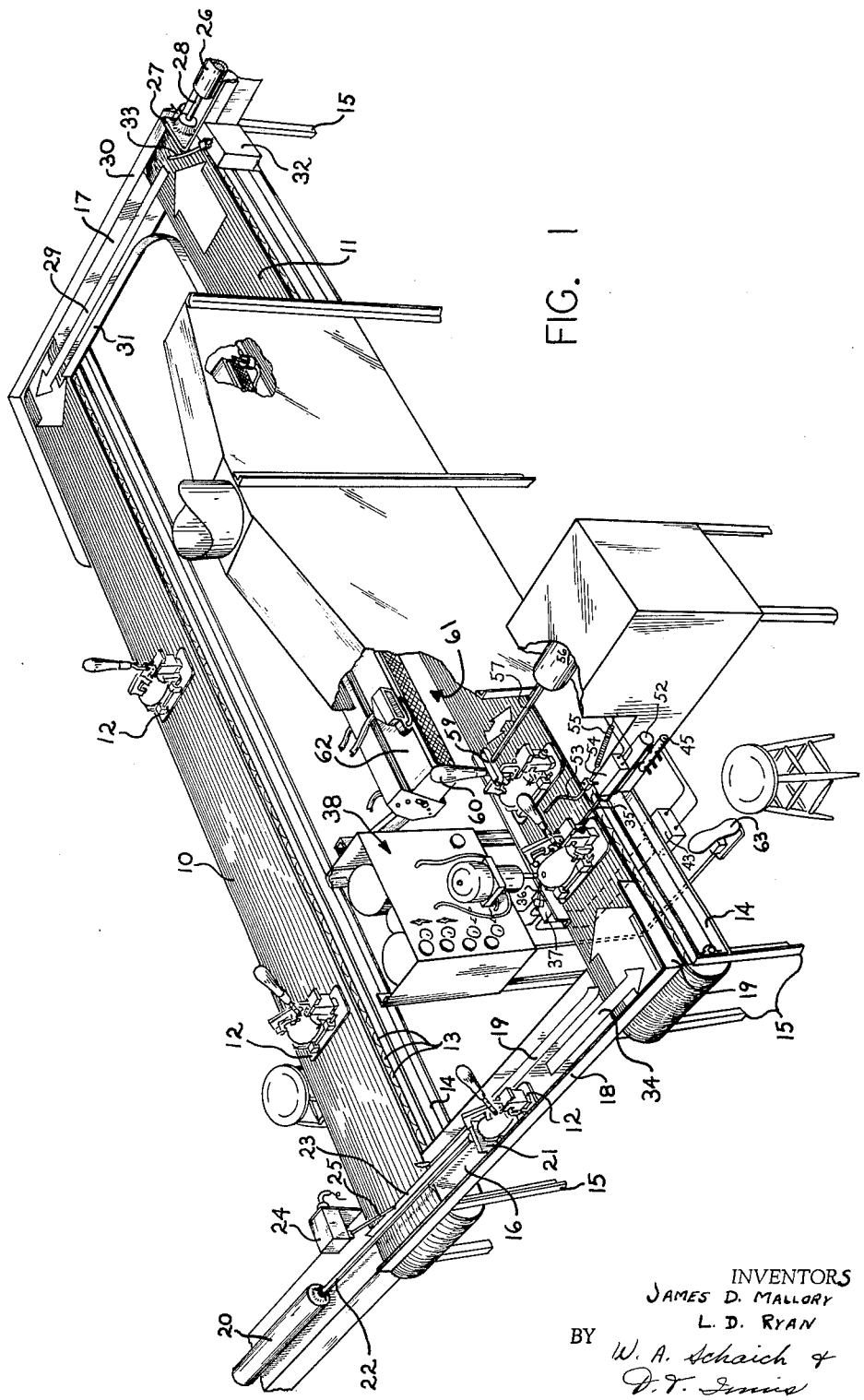
FIG. 1 is a perspective view of the handle joining apparatus of the invention.

With reference to the drawings, the apparatus for carrying out the invention comprises a pair of spaced-apart continuously running conveyors 10 and 11. The conveyor 10 is continuously running in the direction of the arrow shown thereon and the conveyor 11 is continuously running in the opposite direction, as is indicated by the arrow shown thereon. These conveyors are adapted to carry a plurality of tumbler and handle supporting jigs 12. Both conveyors are of the flexible belt type and are supported throughout their travel by a plurality of rollers 13 so as to maintain a substantially planar upper surface. The rollers are supported in channel members 14 which extend throughout the length of the conveyors, it being understood that the channel members are mounted on suitable supporting legs 15 so as to maintain the conveyors at a convenient level above the floor.

The forward end of the conveyor 10 is joined to the receiving end of the conveyor 11 by a slideway 16 and the forward end of the conveyor 11 is joined to the receiving end of the conveyor 10 by a similar slideway 17. An upstanding guide bar 18 extends along one side of the slideway 16 and also extends across the width of both conveyor 10 and conveyor 11. This guide bar 18 serves as a means for limiting the movement of the jigs in the direction of travel of the conveyor 10. Also, during transfer of the jigs from the conveyor 10 to the conveyor 11, the guide bar serves to retain the jigs in straight line motion. The end of the guide bar, which extends over the conveyor 11, has a member 19 joined thereto at right angles which serves to limit the extent of movement of a jig being transferred onto the conveyor 11. The structure of the slideway 16 is completed by an elongated plate extending vertically upward from the surface of the slideway 16 and spaced from the guide bar 18 a distance sufficient to permit movement of a jig therebetween. Thus it can be seen that a jig being transferred from the conveyor 10 to the conveyor 11 will be confined to a relatively straight line path.

The transfer of a jig 12 from the conveyor 10 to the conveyor 11 is accomplished by operation of a fluid motor 20 having a pusher plate 21 connected to the piston rod 22 thereof.

As can be seen when viewing FIG. 1, the pusher plate 21 has an elongated skirt member 23 connected to the edge thereof closest to the member 19. The skirt member extends rearwardly of the pusher plate 21 for a considerable distance and operates to prevent a jig from being moved by the conveyor 10 into position in back of the pusher plate during the movement of the pusher plate in its operation of pushing a jig onto the conveyor 11. In other words, a jig which approaches the forward end of the conveyor 10 will be prevented from moving into pushing position until such time as the pusher plate has been fully retracted. Actuation of the fluid motor 20 is controlled by a switch mechanism 24 mounted adjacent the forward end of the conveyor 10 and having an actuator arm 25 extending into the path of movement of a loaded jig 12. Movement of a jig into transfer position at the forward end of the conveyor 10 physically contacts the arm 25 to operate the switch mechanism 24. It should be understood that the switch mechanism 24 may be of the electrical type and operative to control the positioning of a solenoid valve (not shown), which solenoid valve, as is well known in the art, will control the application of fluid under pressure selectively to the motor 20.

The operation of the transfer mechanism, as described above, is duplicated at the position of the slideway 17 which joins the forward end of the conveyor 11 to the rearward end of the conveyor 10. As can readily be seen, a fluid motor 26 connected to a pusher plate 27 by a piston rod 28 will serve to move a jig from the conveyor 11 to the conveyor 10 in the direction of the arrow 29.

The slideway 17 also is formed with a guide bar 30 and guide member 31 so as to confine the movement of a jig to straight line motion from the forward end of the conveyor 11 to the rearward end of the conveyor 10. Operation of the motor 26 is under the control of a switch 32 having an operating arm 33 extending in the path of travel of jigs being conveyed by the conveyor 11. Thus it can be seen that the jigs 12 (only a few of which are shown in FIG. 1) are moved continuously in a generally rectangular, horizontal path at spaced-apart intervals.

After the jigs have been moved in the direction of the arrow 34 from the forward end of the conveyor 10 to the rearward or receiving end of the conveyor 11, which is continuously driven in the direction of the arrow shown thereon, the jigs will be moved into contact with a stop rod 35 which extends normal to the direction of movement of the conveyor and spaced a relatively short distance above the surface of the conveyor 11. The stop rod 35 prevents the continued travel of a jig with the conveyor 11, and the conveyor will slide beneath the under surface of the jig 12. Movement of the jig into contact with the stop rod 35 also moves a pivotal arm 36 of a micro switch 37. The switch 37 is a double contact type switch which completes a circuit connected to the epoxy resin dispensing mechanism, generally designated 38.

The epoxy dispenser is a commercial item of the Automatic Process Control Company sold under the trade name Microshot Hydrospenser. The details of the Hydrospenser are not described, inasmuch as this is a commercially available unit. It should be understood that the Hydrospenser is supplied from tanks containing an epoxy and a second tank containing a hardener, with the epoxy and hardener being premixed just before passing through the drop forming portion of the Hydrospenser.

The particular compositions of the epoxy resin and hardener do not form part of this invention except to the extent that they are dispensed in drop form on the side wall of a glass article to which a glass handle is to be applied. The specific compositions are disclosed in the copending application of L. J. Wells, Serial No. 212,141, filed July 24, 1962, and assigned to the assignee of this application.

Figure 2:
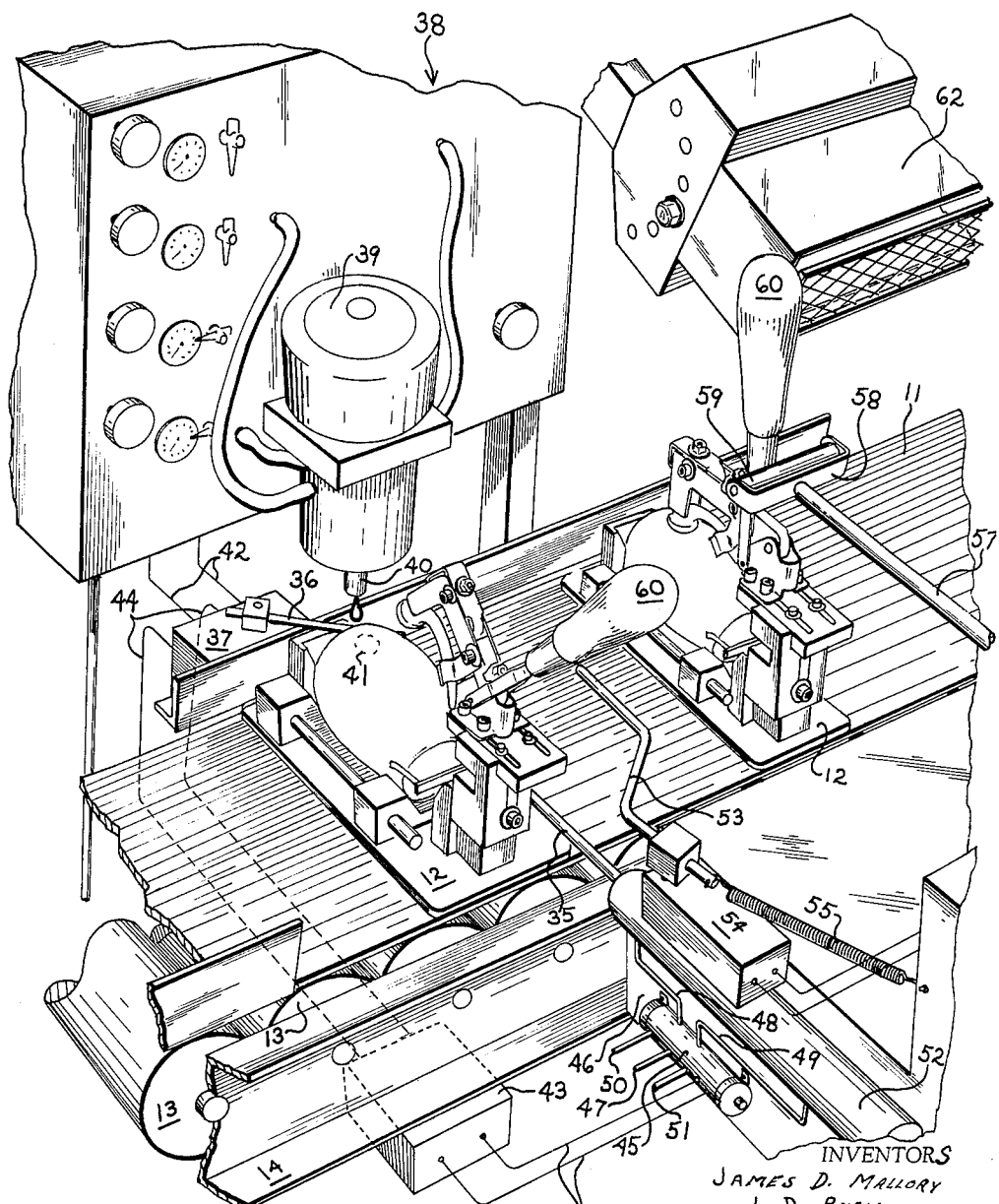
FIG. 2 is an enlarged perspective view of a portion of the apparatus where the epoxy is applied and the handle is moved into contact with the tumbler.

The mixing unit 39 receives metered amounts of epoxy and hardener, wherein the mixing unit, by reason of its design, mixes the two ingredients together and the mixture is then dispensed through the dispensing tube 40 in the form of a drop which is adapted to fall on the side wall of a glass article such as a tumbler. The dotted circle 41 of FIG. 2 illustrates the approximate area which a single drop will cover. The operation and actuation of the Microshot Hydrospenser is under the control of the micro switch 37 through leads 42.

The switch 37 also actuates a time delay relay switch 43. The switch 43 is connected to the switch 37 by leads 44. The output of the time delay switch 43 is connected to a solenoid operated spool valve 45. The spool valve 45 is mounted to the side of a horizontally extending frame member 46 in any suitable manner. Fluid under pressure is supplied to the spool valve through a pipe 47 and the position of the valve spool determines the selective communication of the pipe 47 with the two outlet pipes 48 and 49. Two exhaust pipes 50 and 51 are connected to the spool valve 45, it being understood that when the spool of the valve 45 is positioned by the solenoid, so as to supply fluid under pressure through the pipe 48, the pipe 49 will be connected to the exhaust pipe 51 and by the same token when fluid under pressure is supplied to the pipe 49, the pipe 48 will be connected to the exhaust pipe 50. The spool valve 45 is of the spring return type with its valve spool normally positioned by the spring so that fluid under pressure is fed to the pipe 49. The pipes 48 and 49 are connected to opposite ends of a fluid motor 52 whose piston rod is the stop rod 35.

The motor 52 is reversed by actuation of the solenoid so as to withdraw the stop rod 35 from in front of the jig 12 after the Hydrospenser 38 has delivered a drop of epoxy resin and hardener on the tumbler side wall. The time delay, between actuation of the Hydrospenser and the deposit of the epoxy on the tumbler, is accomplished by the time delay relay switch 43. With the withdrawal of the stop rod 35, the jig will move with the conveyor 11 to the right, as viewed in FIG. 2, and trip an actuating arm 53 of a second microswitch 54. The arm 53 is biased by a spring 55 to return to the position shown in the drawings. Actuation of the microswitch 54 will control the positioning of a spool valve (not shown), in a manner similar to spool valve 45 and a fluid motor 56, to which it is connected. Thus the switch 54 will control the operation of the fluid motor 56.

Tripping of the switch 54 will cause the fluid motor 56 to be actuated to move its piston rod 57 outwardly thereof. The rod 57 carries, at its outer end, a cross member 58 having forwardly extending ends which are adapted to pivotally support a roller 59 therebetween. As can best be seen in FIG. 2, the jigs 12 carry a handle 60 which controls the position of a glass handle retaining portion of the jig. With movement of the jig to the right, as viewed in FIG. 2, and after actuation of the switch 54, the roller 59 is moved into contact with the handle 60 and will move the handle 60 until it is vertically positioned, at which time the glass handle, carried by the jig, will be gently pressed against the side of the tumbler at the location where the epoxy resin has been deposited. After the jigs have moved an amount sufficient to clear the arm 53, the arm will be returned by the spring 55 to the position shown. Opening of the micro switch 54 will reverse the motor 56, thus retracting roller 59 into position preparatory to operating on the next jig.

After the glass handle is applied to the side of the tumbler and retained there by the positioning of handle 60, the jigs will continue to be moved by the conveyor 11 through a heat treating zone, generally designated 61. The heat treating is provided by conveying the jigs past an infrared burner 62. The details of the infrared burner will not be described, inasmuch as this is a commercially available unit supplied by Hupp Corporation.

The conveyor 11 is operated at a speed sufficient to insure that the jigs will be under the infrared burner for approximately two minutes to insure complete curing of the resin in the shortest possible time. After passing through the heating zone 61, the jigs will be transferred from the end of the conveyor 11 to the conveyor 10 and during the travel of the jigs on the conveyor 10, the jigs will be opened and the tumblers with attached handles removed from the jigs. Also, while the jigs are on the conveyor 10, tumblers will be loaded in the jigs and separate handles will also be fitted in the handle-holding portion of the jig.

It has been found that for optimum operation, the speeds of the two conveyors be such that the jigs will be on both conveyors a minimum of nine minutes and a maximum of ten minutes. The infrared burner 62, which concentrates its heat output on the juncture of the handle and tumbler, operates in the temperature range of 150° F. to 400° F. which is sufficient to hasten the curing of the epoxy during the two minutes that the heat is applied. By the time the jig has been transferred to the conveyor 10, curing will be complete.

While the above described apparatus is fully automatic in its operation, with the exception of the requirement that the jigs be loaded and unloaded by hand, it should be kept in mind that the dispensing of the epoxy onto the tumbler side wall and the moving of the glass handle into contact with the side wall of the tumbler may be accomplished by manual operation. With this in mind, a foot treadle 63 is provided which will operate the epoxy dispenser and an operator may position the jigs under the dispenser by hand, press the foot treadle and then manually move the handle 60 into an upright position to apply the glass handle to the side wall of the tumbler.

While applicants have shown and described the method and apparatus by which the invention may be performed, it should be understood that the invention should not be limited by the specific embodiment described, but only by the scope of the appended claims.

We claim:

1. The method of applying a glass handle to the side wall of a glass tumbler comprising the steps of, loading a tumbler orienting jig with a tumbler having its axis generally horizontal, moving the tumbler into predetermined position beneath an epoxy resin dispenser, depositing a drop of resin on the side of the tumbler, moving the attaching portion of a glass handle into engagement with the resin coated portion of the tumbler side wall, retaining the handle and tumbler in engagement and curing the resin whereby the handle is fixed to the tumbler.

2. The method of applying a glass handle to the side wall of a glass tumbler comprising the steps of, loading a tumbler orienting jig with a tumbler having its axis generally horizontal, moving the tumbler into predetermined position beneath an epoxy resin dispenser, depositing a drop of resin on the side of the tumbler, moving the attaching portion of a glass handle into engagement with the resin coated portion of the tumbler side wall, retaining the handle and tumbler in engagement and heat curing the resin whereby the handle is fixed to the tumbler.

3. The method of applying a glass handle to the side wall of a glass tumbler comprising the steps of, loading a tumbler orienting jig with a tumbler having its axis generally horizontal, placing a glass handle in the jig in spaced relation to the tumbler, depositing a drop of resin on the side of the tumbler, closing the jig to move the attaching portion of a glass handle into engagement with the resin coated portion of the tumbler side wall, retaining the handle and tumbler in engagement and heat curing the resin whereby the handle is fixed to the tumbler.

References Cited by the Examiner

UNITED STATES PATENTS

| | | |
|---|---|---|
| 2,140,614 | 12/1938 | Bancroft _____ 156—295 |
| 2,206,964 | 7/1940 | Kimball et al. _____ 156—363 |
| 2,432,988 | 12/1947 | Green _____ 156—363 |
| 2,531,660 | 11/1950 | Ziegler _____ 156—295 |
| 2,695,650 | 11/1954 | Weisenburg _____ 156—363 |
| 2,703,130 | 3/1955 | Wilckens et al. _____ 156—363 |
| 2,722,333 | 11/1955 | Hesson _____ 156—363 |
| 2,976,200 | 3/1961 | Stover _____ 156—295 |
| 3,010,045 | 11/1961 | Plagge et al. _____ 156—330 X |
| 3,155,204 | 11/1964 | Campbell et al. ____ 156—295 X |
| 3,184,359 | 5/1965 | Lissac _____ 156—556 |

EARL M. BERGERT, *Primary Examiner.*

HAROLD ANSHER, *Examiner.*